US008185523B2

(12) United States Patent
Lu et al.

(10) Patent No.: US 8,185,523 B2
(45) Date of Patent: May 22, 2012

(54) SEARCH ENGINE THAT APPLIES FEEDBACK FROM USERS TO IMPROVE SEARCH RESULTS

(75) Inventors: Yunshan Lu, Palo Alto, CA (US); Gordon P. Rios, Palo Alto, CA (US); Michael Tanne, Los Altos, CA (US)

(73) Assignee: Search Engine Technologies, LLC, Los Altos, CA (US)

( * ) Notice: Subject to any disclaimer, the term of this patent is extended or adjusted under 35 U.S.C. 154(b) by 88 days.

(21) Appl. No.: 11/378,756

(22) Filed: Mar. 17, 2006

(65) Prior Publication Data
US 2007/0106659 A1    May 10, 2007

Related U.S. Application Data

(60) Provisional application No. 60/663,361, filed on Mar. 18, 2005.

(51) Int. Cl.
*G06F 17/30* (2006.01)
(52) U.S. Cl. ............. 707/723; 707/748; 707/999.003
(58) Field of Classification Search .......... 707/1, 2, 707/3, 5, 7, 101, 103 R; 709/203
See application file for complete search history.

(56) References Cited

U.S. PATENT DOCUMENTS

| | | | |
|---|---|---|---|
| 6,029,195 A | 2/2000 | Herz | 709/219 |
| 6,256,622 B1 | 7/2001 | Howard, Jr. et al. | 707/3 |
| 6,324,566 B1 | 11/2001 | Himmel et al. | 709/203 |
| 6,327,590 B1 * | 12/2001 | Chidlovskii et al. | 707/5 |
| 6,360,215 B1 | 3/2002 | Judd et al. | 707/3 |
| 6,601,075 B1 | 7/2003 | Huang et al. | 707/104.1 |
| 6,718,365 B1 | 4/2004 | Dutta | 709/203 |
| 6,775,664 B2 | 8/2004 | Lang et al. | 707/3 |
| 6,823,491 B1 | 11/2004 | McBrearty et al. | 715/513 |
| 7,188,117 B2 | 3/2007 | Farahat et al. | 707/101 |
| 7,283,997 B1 * | 10/2007 | Howard et al. | 1/1 |
| 7,395,259 B2 | 7/2008 | Bailey et al. | |
| 7,890,501 B2 | 2/2011 | Lunt et al. | |
| 2002/0120609 A1 | 8/2002 | Lang et al. | 707/1 |
| 2002/0129014 A1 | 9/2002 | Kim et al. | 707/5 |
| 2002/0165856 A1 | 11/2002 | Gilfillan et al. | |
| 2003/0041054 A1 * | 2/2003 | Mao et al. | 707/3 |

(Continued)

FOREIGN PATENT DOCUMENTS

JP   2001-350794   12/2001

(Continued)

OTHER PUBLICATIONS

Wee Meng Soon et al., "Corpus-Based Learning for Noun Phrase Coreference Resolution", DSO National Laboratories, pp. 285-291.

(Continued)

*Primary Examiner* — Jean B Fleurantin
*Assistant Examiner* — Anteneh Girma
(74) *Attorney, Agent, or Firm* — Haverstock & Owens LLP

(57) ABSTRACT

The present invention is directed to methods of and systems for ranking results returned by a search engine. A method in accordance with the invention comprises determining a formula having variables and parameters, wherein the formula is for computing a relevance score for a document and a search query, and ranking the document based on the relevance score. Preferably, determining the formula comprises tuning the parameters based on user input. Preferably, the parameters are determined using a machine learning technique, such as one that includes a form of statistical classification.

24 Claims, 5 Drawing Sheets

U.S. PATENT DOCUMENTS

| | | | |
|---|---|---|---|
| 2003/0212663 | A1 | 11/2003 | Leno et al. |
| 2004/0024755 | A1* | 2/2004 | Rickard .......................... 707/3 |
| 2004/0030697 | A1 | 2/2004 | Cochran et al. |
| 2004/0068486 | A1* | 4/2004 | Chidlovskii ..................... 707/3 |
| 2004/0117354 | A1 | 6/2004 | Azzaro et al. |
| 2005/0033771 | A1 | 2/2005 | Schmitter et al. .......... 707/104.1 |
| 2005/0071328 | A1* | 3/2005 | Lawrence ........................ 707/3 |
| 2005/0131866 | A1 | 6/2005 | Badros et al. |
| 2005/0149473 | A1* | 7/2005 | Weare .............................. 707/1 |
| 2005/0149499 | A1 | 7/2005 | Franz et al. ..................... 707/3 |
| 2005/0234972 | A1* | 10/2005 | Zeng et al. ................ 707/103 R |
| 2005/0289120 | A9 | 12/2005 | Soulanille et al. |
| 2006/0173880 | A1 | 8/2006 | Alberts et al. |
| 2006/0271524 | A1 | 11/2006 | Tanne et al. ..................... 707/3 |
| 2007/0011154 | A1 | 1/2007 | Musgrove et al. |
| 2007/0112761 | A1 | 5/2007 | Xu et al. .......................... 707/5 |
| 2007/0185858 | A1 | 8/2007 | Lu et al. .......................... 707/5 |

FOREIGN PATENT DOCUMENTS

| | | |
|---|---|---|
| JP | 2004-013323 | 1/2004 |
| WO | WO99/66427 | 12/1999 |

OTHER PUBLICATIONS

Julian Kupiec et al., "A Trainable Document Summarizer", Xerox Palo Alto Research Center, 6 pages.

Hwee Tou Ng et al., "A Machine Learning Approach to Answering Questions for Reading Comprehension Tests", DSO National Laboratories, pp. 124-132.

Lynette Hirschman et al., "Deep Read: A Reading Comprehension System", The MITRE Corporation, pp. 325-332.

Stephen Soderland, "Learning Information Extraction Rules for Semi-Structured and Free Text", Machine Learning, 34, 233-272 (1999).

Jimin Liu et al., "Building Semantic Perceptron Net for Topic Spotting", School of Computing, National University of Singapore, 8 pages.

Yiming Yang et al., "A Comparative Study on Feature Selection in Text Categorization", 9 pages.

Richard M. Tong et al., "Conceptual Information Retrieval using RUBRIC", Advanced Decision Systems, pp. 247-253.

K. Sparck et al., "A probabilistic of information retrieval: development and status", Computer Laboratory, University of Cambridge, Aug. 1998, pp. 1-74.

Gerard Salton, "Dynamic Document Processing", Communications of the ACM, 15(7), 658-668 (1972).

Sergey Brin et al., "The Anatomy of a Large-Scale Hypertextual Web Search Engine", Computer Science Department, Stanford University, pp. 1-26.

Yiming Yang et al., "A re-examination of text categorization methods", Proceedings of SIGIR '99, pp. 42-49.

Steve Lawrence & C. Lee Giles, "Accessibility of information on the web", Nature, 400(8), Jul. 1999, pp. 107-109.

Claire Cardie "Empirical Methods in Information Extraction", Al Magazine, 18(4), 1997, pp. 65-79.

Arjomandi, Noosha, Non-Final Office Action mailed Jul. 8, 2009, U.S. Appl. No. 11/364,617, 15 pages.

Vladimir Eske "User Profile Management in a Web Search Engine", Computer Science Department Saarland University, Jun. 2004, pp. 1-123.

Search Report and Preliminary Opinion, European Patent Office, dated Sep. 6, 2010, European Patent Application No. 06738810.8, Search Engine Technologies, LLC.

Notification of Examination, Taiwan Intellectual Property Office, dated Sep. 23, 2010, Taiwan Patent Application No. 095109496, Wink Technologies.

Foreign Office Action; China State Intellectual Property Office, dated Sep. 27, 2010, Chinese Patent Application No. 2006800172703.7, Filed Mar. 17, 2006.

Foreign Office Action, Japan Patent Office, dated May 11, 2011, Japan Patent Application No. 2007-558198, Filed Aug. 28, 2007.

Foreign Office Action, Japan Patent Office, dated May 12, 2011, Japan Patent Application No. 2008-502111, Filed Sep. 18, 2007.

Yu Suzuki, An Automatic Selection Method of Integration Function, Technical Report of IEICE, Japan, The Institute of Electronics, Information and Communication Engineers, Jul. 7, 2004, vol. 104, No. 177, pp. 195-200.

Foreign Office Action, China Patent Office, dated Jul. 6, 2011, China Patent Application No. 200680013556.8, Filed Feb. 28, 2006.

\* cited by examiner

SEARCH ENGINE THAT APPLIES FEEDBACK FROM USERS TO IMPROVE SEARCH RESULTS

RELATED APPLICATION

This application claims priority under 35 U.S.C. §119(e) of the U.S. provisional application Ser. No. 60/663,361, filed on Mar. 18, 2005, and titled "Search Engine that Applies Feedback from Users to Improve Search Results," which is hereby incorporated by reference.

FIELD OF THE INVENTION

The invention relates to an application for searching the Internet, and more specifically to an application for searching the Internet that applies feedback from people who use the search application to improve the quality of search results.

BACKGROUND OF THE INVENTION

Internet search engines are designed to locate desired information from amongst the vast amount of information contained across the Internet. Users describe the information they are looking for by entering queries containing search terms. The search engine matches the search terms against an index of Web pages using a variety of relevance calculations with the objective of identifying those Web pages that are most likely related to the information sought by the users. The search engine then returns a ranked list of hyperlinks to these Web pages, with links to those pages thought to be most relevant nearer the top of the list.

The objective of search engines is to deliver the most relevant Web pages for a given query. Early search engines determined the relevance of Web pages using information contained within each page, such as the presence, density, and proximity of the search terms within the document. More advanced search engines consider information relating to links between the Web pages when determining relevance.

The process of determining which Web pages are most relevant is very difficult because the number of Web pages on the Internet is very large and growing, and there are often a large number of Web pages that nominally satisfy the users' queries. Many different concepts can be referred to with the same or similar terms. Most users are not sophisticated in the process of creating and entering well-formed queries, so there is ambiguity in what type of information they are seeking.

The results returned by search engines are susceptible to manipulation. Web site operators can add content or meta data or hyperlinks from other Web sites to their Web pages, with the objective of having search engines return links to their Web pages high in the ranked list of results. This has the result that some Web pages which do not contain the information users are seeking are ranked high in the results list, thus reducing the overall perceived accuracy of the search result. This practice is often referred to as Search Engine Optimization (or "SEO"). Search engines must expend an ever-increasing effort just to maintain a consistent level of relevance in the face of SEO. It would be desirable for a search engine to be able to gather feedback directly from users to determine which Web pages satisfied or did not satisfy their query, in order to deliver more relevant results for subsequent queries by the same or different users.

Over time, the operators of search engines make adjustments to the methods used to determine relevance, and to the weights applied to each of these methods in order to maintain or improve the accuracy of their search engine. This process usually involves experimentation, such as having test users score the results delivered by the search engine for different queries. The scores can be compiled and analyzed in order to decide what methods to use or what weights to apply. This process is time consuming, imprecise, unrepresentative and inflexible. It would be desirable to use a feedback mechanism that took input directly from real users, and adjusted the search relevance methods and weights to increase the accuracy of the search engine.

Additionally, users have different intentions when they enter a query because they may have a different understanding of the search terms, have different tastes and interests, or are in a different "mode" of search. For example, if three different users enter the query "iPod", the first user may be shopping for an iPod, the second user may be searching for news about iPod, and the third user may be searching for information or reviews about iPod. Users could give some kind of indication about their interests and objectives when conducting a search. Therefore it would be desirable to develop a search engine that was able to consider the different modes of searching and the differences between the interests of users when determining which results are relevant to the users queries.

SUMMARY OF THE INVENTION

The present invention is directed to methods of and systems for predicting the relevance of documents to a search query, thereby returning more relevant results to a user performing the search. In a preferred embodiment, a method in accordance with the present invention uses a formula to predict the relevance of multiple documents to a search query, ranks the documents based on the relevance of each, and returns the ranked list to a user in response to a search query. Preferably, user inputs are used to tune the parameters of the formula to increase the likelihood that the returned documents are relevant to the search query.

In a first aspect of the present invention, a method of ranking documents in response to a search query includes (a) determining a formula having variables and parameters, wherein the formula is for computing a relevance score for a document and a search query; and (b) ranking the document based on the relevance score. Preferably, the method also includes returning a results list in response to the search query. The results list contains a link to the document ranked within the results list based on the relevance score.

In one embodiment, determining the formula includes tuning the parameters based on user input. The formula is derived from any one or more features such as a tag, a term within the document, a location of a term within the document, a structure of the document, a link to the document, a position of the document in a search results list, and a number of times the document has been accessed from a search results list, term scores, section information, link structures, anchor text, and summaries. Alternatively, or additionally, the features include a user representation, a time of a user input, blocking, a user identifier, or a user rating of the document.

In one embodiment, the formula corresponds to a user model and a group model. The user model is for determining a relevance score of the document and a search query for a user. The group model is for determining a relevance score of the document and a search query for a group of users. The method further comprises comparing the user model to the group model to determine a bias toward the document.

Preferably, the parameters are determined using a machine learning technique. In one embodiment, the machine learning technique comprises a form of statistical classification, such as a logistic regression analysis, a support vector machine, neural networks, boosted trees, random forests, naive Bayes, or graphical models. In another embodiment, the machine learning technique uses a conjugate gradient descent.

In another embodiment, one or more variables of the formula are generated from the user input. The user input is tagging the document, rating a relevance of the document, blocking the document, or any combination of these.

In one embodiment, the relevance score is for a user registered on a search engine site and is used to determine a relevance score for a document and a search query for a user not registered on the search engine site.

In a second aspect of the present invention, a method of organizing a search results list includes (a) updating a relevance formula comprising variables and parameters, wherein the relevance formula is for determining a relevance score for each of multiple results returned in response to a search query; and (b) returning a search results list containing the multiple results in response to the search query, wherein the multiple results are ranked using a relevance score for each of the multiple results. In one embodiment, updating the relevance formula includes updating the parameters. Preferably, the parameters are updated using user input, such as by tagging a document, rating a relevance of a document in response to a search query, and blocking a document.

Preferably, the relevance formula is derived using a machine learning technique, such as one comprising a form of statistical classification. Preferably, the statistical classification is logistic regression analysis, support vector machine, neural networks, boosted trees, random forests, naive Bayes, or graphical models. In another embodiment, the machine learning technique uses a conjugate gradient descent.

In a third aspect of the present invention, a method of ranking results returned by a first search engine comprises receiving a first results list containing documents ranked by a first search engine in response to a search query; receiving a second results list containing documents ranked by a second search engine in response to the search query; determining a formula having variables and parameters, the formula for determining a relevance score for a document in response to the search query; and returning a third results list containing documents in the first results list and the second results list ranked using a relevance score for each document in response to the search query. Embodiments of the present invention are thus able to function using results returned by one or multiple search engines. Preferably, the formula is determined using user input.

In one embodiment, the formula is determined using ranks of the documents in the first results list and ranks of the documents in the second results list. The parameters are determined using a machine learning technique, such as one that includes a form of statistical classification. In alternative embodiments, the statistical classification is a logistic regression analysis, a support vector machine, neural networks, boosted trees, random forests, naive Bayes, or graphical models.

In a fourth aspect of the present invention, a system for returning a ranked list of results in response to a search query comprises a first database coupled to a relevance model. The first database is for storing user inputs for ranking results from the multiple results in response to a first search query. The relevance model is for using the user inputs to calculate a relevance score for each result from the multiple results for a second search query.

In one embodiment, the system also includes a search engine coupled to the first database. The search engine is for receiving a search query, ranking the multiple results based on a relevance score for each result, and returning a search results list containing the ranked multiple results. Preferably, the relevance model is configured to be updated using the user input. In another embodiment, the relevance model is configured to use a machine learning technique such as one that includes a form of statistical classification. In alternative embodiments, the statistical classification is a logistic regression analysis, a support vector machine, neural networks, boosted trees, random forests, naive Bayes, or graphical models. In another embodiment, the machine learning technique uses a conjugate gradient descent.

In one embodiment, the relevance model is for determining a set of user specific parameters for determining a relevance score for a search query and a document for a specific user. In another embodiment, the relevance model is also for determining parameters of a group model for determining a relevance score for a search query and a document for a group of users.

In one embodiment, the system also includes a second database for storing one or more features for updating the relevance model. Features include any one or more of a tag, a term within a document, a location of a term within a document, a structure of a document, a link to a document, a position of a document in a search results list, a number of times a document has been accessed from a search results list, term scores, section information, link structures, anchor text, summaries, a user representation, a time of a user input, blocking, a user identifier, and a user rating of the document.

In a fifth aspect of the present invention, a system for organizing multiple results in a search results list comprises a relevance model coupled to a search engine, and a database coupled to the search engine and the relevance model. The relevance model is for using user input to determine a relevance score for a document and a search query. The search engine is for receiving a search query and returning a search results list containing results that are ranked according to a relevance score for each document and the search query. The database is for storing a set of features used by the relevance model to determine a relevance score for a document and a search query.

In one embodiment, the database includes a user database coupled to the search engine and a user input database coupled to the relevance model. The user database is for storing user input on the search results list and the user input database is for storing the set of features. The set of features includes any one or more of a tag, a term within a document, a location of a term within a document, a structure of a document, a link to a document, a position of a document in a search results list, a number of times a document has been accessed from a search results list, term scores, section information, link structures, anchor text, summaries, a user representation, a time of a user input, blocking, a user identifier, and a user rating of a document.

Preferably, the system also includes a Web server coupled to the database and a document index coupled to both the relevance model and the search engine.

Preferably, the relevance model is configured to use a machine learning technique, such as one that includes a form of statistical classification. In alternative embodiments, the statistical classification is a logistic regression analysis, a support vector machine, neural networks, boosted trees, random forests, naive Bayes, or graphical models. In another embodiment, the machine learning technique uses a conjugate gradient descent.

DETAILED DESCRIPTION OF THE PREFERRED EMBODIMENTS

Figure 1:
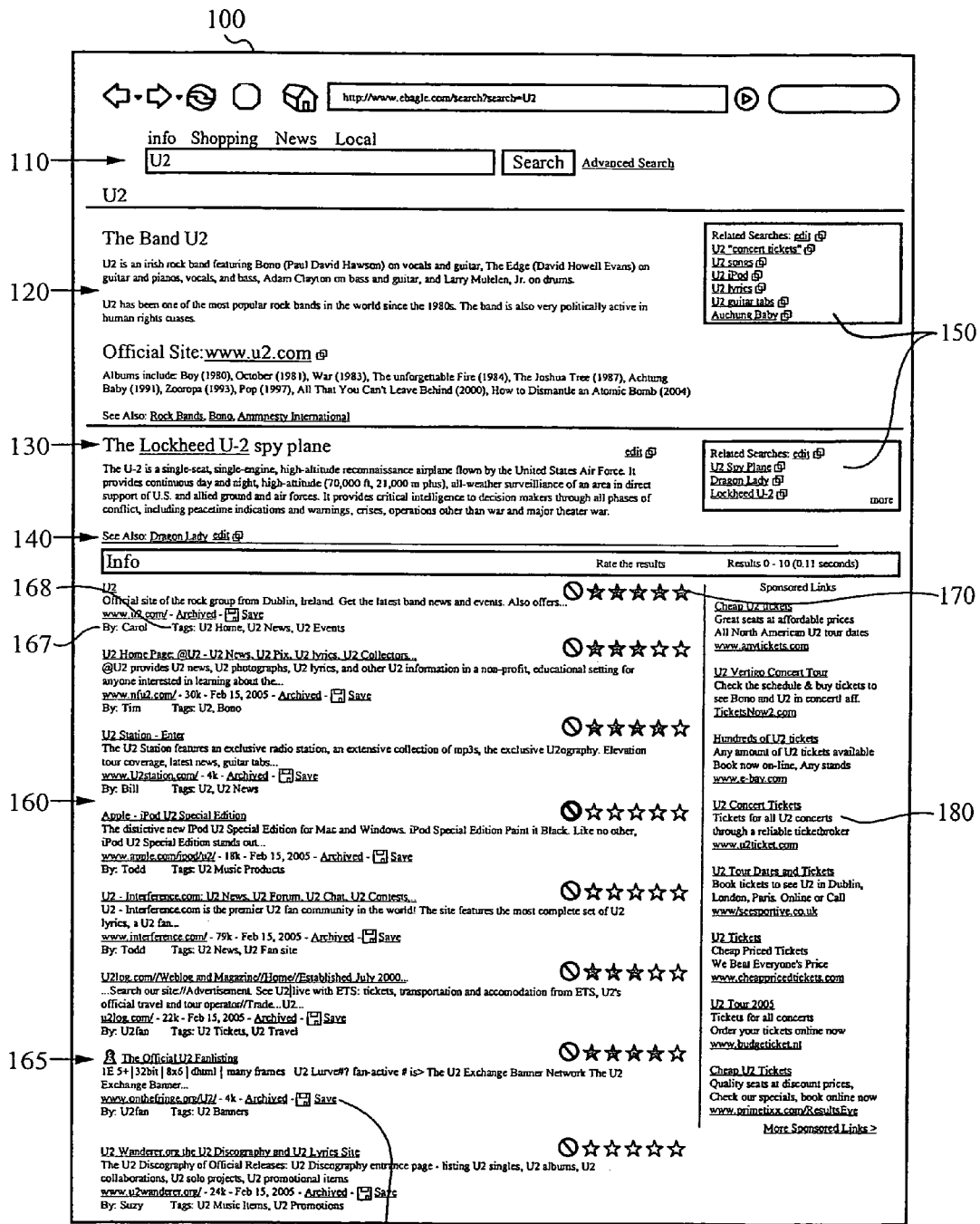
FIG. 1 is a schematic illustration of an exemplary graphical user interface displaying a search result list incorporating user feedback and mechanisms for users to provide feedback.

Embodiments of the present invention, unlike traditional search engines, make use of user feedback to provide more relevant information to users searching the Internet. For example, in accordance with the present invention, a first user performing a search is able to rate the results of that search. The first user can rate the results based on the relevance of the results to his search, the abundance of information contained in a specific Web page returned in a results list, or any other criteria. A second user performing a similar or related search is then able to view a results list based on or influenced by the rating of the first user, thereby displaying search results that are more likely most relevant to him. This second user is also able to rate search results. A community of users is thus able to provide feedback that helps users to receive search results that are as relevant to the information they are seeking as possible. Systems for and methods of using user feedback are described in U.S. patent application Ser. No. 11/364,617, titled "Methods of and Systems for Searching by Incorporating User-Entered Information," and filed Feb. 27, 2006, which is incorporated by reference.

In accordance with other embodiments of the present invention, there are several methods for rating search results including, but not limited to, (1) mechanisms for providing feedback on the relevance of links in the results list, (2) mechanisms for saving links that can be displayed on personal search pages or voting for relevant links, and (3) mechanisms for "blocking" links to Web pages that are unrelated to the search result or offensive in nature. Other embodiments include displays and links to related search terms and sponsored links.

In accordance with other embodiments of the present invention, search result pages can also include selected items for display including, but not limited to, (1) text from Web pages relevant to the search, (2) descriptions of different concepts relating to the query terms, (3) suggested query terms, (4) "See also" links to other concepts, and (5) sponsored links.

Throughout the following description, the term "search engine" is used to refer to an apparatus (or programs running on general purpose computers) that take as input a query and return a results list of hyperlinks to electronic documents or Web pages. The search engine includes the index of documents in its corpus, the code and algorithms that determine the relevance of each document, and the graphical user interface that delivers the results list to the user.

Throughout the following description the term "query" refers to a set of terms submitted to the search engine whether typed, spoken, submitted through a "link" that already has embedded a set of search terms, or submitted by any other interface. A query may comprise a single word, multiple words, or phrases. The query can be phrased as a question (e.g., a "natural language" query), a loose set of terms, or a structured Boolean expression. Indeed, a query can comprise symbols or any other characters used by a search engine to search for electronic documents or Web pages containing or related to the search characters.

Throughout the following description, the term "Web site" is used to refer to a collection of Web pages that are linked together and are available on the World Wide Web. The term "Web page" refers to a publication accessible over the World Wide Web from any number of hosts and includes, but is not limited to, text, video, images, music, and graphics.

Throughout the following description the term "results list" refers to a list of hyperlinks that reference documents or Web Pages that are accessible using the Hypertext Transfer Protocol (HTTP) or any other protocol for accessing Web pages or other electronic documents, along with other associated information for each link, including, but not limited to, titles of the documents, summaries of the documents, links to cached copies of the documents, the date on which the documents were last indexed or last modified, images associated with or located within the documents, and information extracted from the documents.

As used herein, the term "document" is defined broadly, and includes, in addition to its ordinary meaning, computer files and Web pages, whether those pages are actually stored or are generated dynamically in response to a request to display. The term "document" is not limited to computer files containing text, but also includes computer files containing graphics, audio, video, and other multimedia data.

As used herein, the term "machine learning" refers to the process, and the algorithms by which a software system can adapt its behavior to create an optimal outcome by observing certain events or analyzing certain information.

As user herein, the term "statistical model" refers to a mathematical formulation (e.g., numerical or analytical) that computes a score given a set of input. The parameters of the formulation can be obtained using a machine learning process. As used in the present invention, statistical models can be based on user feedback, other information from search events, or a combination of these, and generated using any of a variety of mathematical techniques.

As described in greater detail below, a search engine takes a query entered by a user, and matches the search terms against an index of Web pages using a variety of relevance calculations with the objective of identifying those Web pages that are most likely related to the information sought by the users. The search engine then returns a ranked list of hyperlinks to these Web pages, with the links thought to be most relevant nearer the top of the list. In accordance with the present invention, a search engine returns a results list based on user input, and users have the ability to rate the results to, for example, affect the order of the documents or links listed in the results list. In accordance with the present invention, search results are able to be ranked in response to users tagging sites they think are relevant, even if they visit the site outside the context of a search, or even if they tag it with terms different from those used to generate the search results.

As described in greater detail below, a search engine takes a query entered by a user, and matches the search terms against an index of Web pages using a variety of relevance calculations with:the objective of identifying those Web pages that are most likely related to the information sought by the users. The search engine then returns a ranked list of hyperlinks to these Web pages, with the links thought to be most relevant nearer the top of the list. In a typical search the search engine returns primarily the results list, and users do not have the ability to input information into the system.

In accordance with the present invention, when a user is delivered a page containing a results list, he may choose to provide feedback on the results on the page, which will be submitted to a model which analyzes the feedback and adjusts the relevance methods and weights to increase the relevance of results delivered to users who subsequently access the search engine by entering a query which is the same, or different.

FIG. 1 is a screen shot of a graphical user interface (GUI) displaying a results page 100 returned in response to a query in accordance with the present invention. The GUI allows users to rate individual search results, block individual search results, or save individual search results. In addition, users may add, edit and view descriptions about the concept or concepts relating to a query term and add, edit and view advice on how to search for information about the concept.

The results page 100 comprises a box 110 for inserting a query term, and an area 160 containing the results list returned by the search engine. The area 160 also contains mechanisms 170 for entering user feedback and mechanisms 190 for saving links associated with each result returned by the search engine. The results page 100 also includes an area 120 for displaying a description for a concept related to the query term, an area 130 containing a description of a different concept relating to the query term, an area 140 containing "See also" links to concepts relating to other query terms, an area 150 containing a list of links which will cause related query terms to be executed, and an area 180 of sponsored links. As described in more detail below, in a preferred embodiment the results in area 160 can be modified for subsequent queries by other users based on rating or blocking links 170 or saving links 190 for later display. As shown in the example of FIG. 1, when a user enters the query term "U2" in the box 110 and requests a search, the results page 100 is returned to him. The area 120 displays a description of one concept related to the query term "U2", here a description of the band "U2", as entered by users. The area 130 shows descriptions of a different concept for the query "U2", here the U2 spy plane, as entered by users. The area 150 displays query terms for related searches that the user may also be interested in having the search engine execute, such as "U2 concert tickets" or "U2 iPod", as entered by users or derived by algorithms. The area 140 contains "See also" hyperlinks to concepts relating to other query terms, as entered by users or derived by algorithms, such as "Bono" for the concept of "U2 the band" or "Dragon Lady" for the concept of "U2 the spy plane."

The area 160 contains the results of the search as well as user feedback mechanisms 170. Using the user feedback mechanisms 170, a user can rate how well the corresponding Web page matched what he was looking for. In other words, if a first Web page listed in the area 160 contained relevant information about the rock band U2 sought by the user, then the user can use the user feedback mechanism 170 to rate the link with a high score (e.g., 5 stars). A second Web page devoted to the name of a clothing line called "U2", irrelevant to the concept sought by the user but listed in the area 160, could be rated with a low score (e.g., 1 star). In accordance with the present invention, when a later user also interested in the band "U2" searches with the query "U2", the results list returned to him would contain the first Web page (ranked with 5 stars) closer to the top of the results list and the second Web page (ranked with 1 star) closer to the bottom of the results list, or not even listed at all. In this way, a user would be presented with a results list having only the most relevant results listed first. A user sequentially visiting the sites in the results list has a greater chance of viewing sites most relevant to the concept he is seeking. The order of the items in the results list is thus based on user feedback, in addition to meta data and other information over which users have no input.

Users can add descriptions 120 and 130 about one or more concepts relating to a query term, providing some background information about the concept referred to by the query or advice on how to search for information about that concept. Users can also modify, enhance or remove descriptions about the concept relating to a query term that have previously been added or modified by themselves or other users. Users can add, modify or delete hyperlinks or "see also" references 140 linking to concepts relating to different query terms. Users can add suggested queries 150 for a concept that, when clicked on, causes the query to be submitted to a search engine. The search engine may also generate suggested query terms using a computer algorithm.

Users are able to add or save links to documents they consider to be highly relevant to the concept. Users can save links to documents they consider to be highly relevant to the concept. This can be done by clicking on a hyperlink or icon 190 marked "Save", or referred to by other terms such as "Bookmark", "Tag", or "Add to Favorites." Since different users will have different ideas about which sites are most relevant, algorithms in accordance with the present invention determine the order of the sites listed. In one embodiment, the algorithm uses a democratic process, such that the documents receiving the most "votes" (e.g., "saved" by the largest number of users) are placed higher in the results list.

If the link to a document that is "saved" also shows up in the results list generated by the search engine, then an icon 165 can be used to show that this link is also one that has been voted for by users. Also, below each search result is a "By" entry 167, which shows the name of the user who added the link so that it could be returned as part of the results list, and a "Tags" entry 168, which lists the terms that the user tagged the link with or that were generated by a previous search.

In accordance with the present invention, links to Web sites can be listed in two ways, either of two separate lists: the results list (algorithmic) and the user-entered links or integrated into one list, with the user-entered links marked with an icon as described above.

It will be appreciated that many modifications can be made in accordance with the present invention. For example, user generated feedback can be read from a file rather than input by a user directly from a terminal. Moreover, while the results page 100 shows areas such as "See also" links 140, it will be appreciated that in accordance with the present invention, results pages containing user-entered information can be displayed with any combination of areas, including or in addition to those shown in FIG. 1. This information is used to make search results more comprehensive, accurate, and meaningful.

Figure 2:
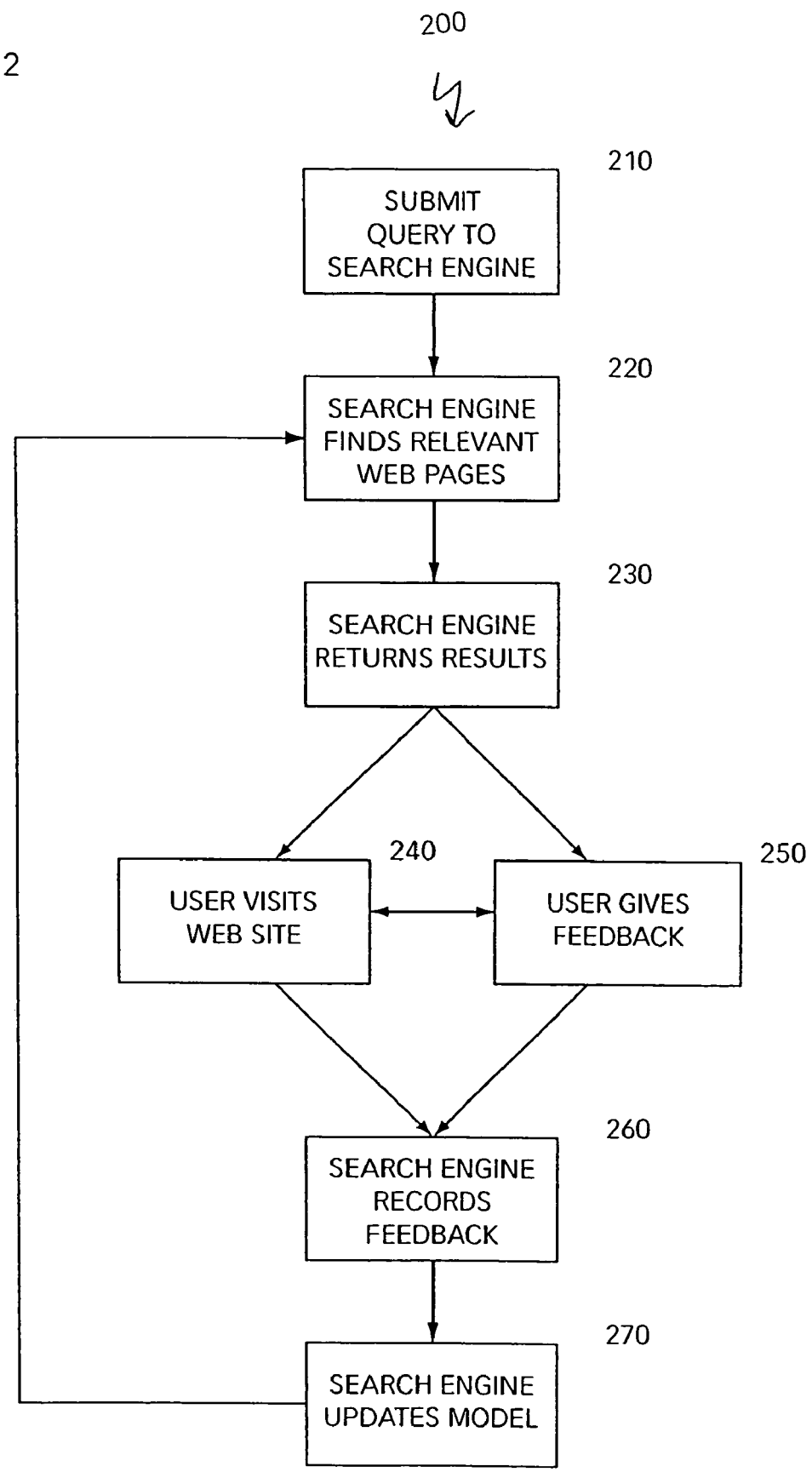
FIG. 2 is a flow diagram illustrating the operation of an exemplary Internet search application capable of applying user feedback to the process of ranking documents.

FIG. 2 is a flow diagram illustrating the operation of an Internet search application 200 in accordance with the present invention. The Internet search application 200 provides the ability for users to provide feedback to the system, thereby allowing other users to receive more relevant search results based on an analysis of the user feedback. The information is used to adjust the methods and weights used by the search engine to rank documents in a results list generated in response to a specific query. The search engine can thus be "tuned" in response to user feedback to return more relevant results.

In the step 210, the user submits a query to a search engine. The process then continues to the step 220, in which the search engine matches the query to assemble a list of the most relevant results. The step 220 proceeds to the step 230, in which the results page (e.g., 100, FIG. 1) is sent to the user. The step 230 proceeds to either of the steps 240 or 250.

In the step 240, the user follows one or more of the links to visit the Web pages in the results list. Alternatively, in the step 250, the user is able to interact with a feedback mechanism (e.g., area 170, FIG. 1) in order to provide feedback to the search engine. In the step 250, the user is also able to click on a mechanism to save links (e.g, area 190, FIG. 1) to record links with the search engine. From the step 240, visiting Web sites, the user can proceed to the step 250, giving feedback and alternatively from the step 250, the user can proceed to the Step 240. Both of the steps 240 and 250 lead to the step 260, in which the search engine records feedback from the user. The step 260 leads to the step 270 in which the model for search relevance is updated for use in subsequent searches. The step 270 loops back to step 220, in which the search engine determines which links are relevant for subsequent queries using the values provided by the updated model.

It will be appreciated that embodiments of the present invention are able to be used with one or more than one search engines. As one example, a first search engine returns a list of documents in accordance with relevance factors employed by the first search engine. A second search engine is then able to rank those results alone or those results in combination with results generated by the second search engine in accordance with the present invention. All or any combination of results is then able to be used to update a relevance model in accordance with the present invention. Thus, a search in accordance with the present invention is able to run on a meta search engine.

A system in accordance with one embodiment is based on a Web search engine portal site with both registered users and unregistered visitors. As with all search engines for each user query document Uniform Resource Locators (urls) are ranked from highest relevance score to lowest and presented back to the user in that order. The relevance score is the probability p(R|X) that the document d is relevant for the query q given features (or observed evidence) contained in X, where subscripts are dropped here, and later, for clarity. P(R|X) is approximated by the function $\mu(X) = 1/[1+e^{-\theta * X}]$ where X is a vector of features, and $\theta$ is a vector of parameters including an intercept term multiplied by a constant input of 1.0; the negative of $\theta$ is taken so that a positive coefficient indicates positive evident of relevance. It is assumed that this probability is modeled using a logistic regression X is composed of both document specific features (e.g. document length, etc.) and query-document features such as query occurrence in document title, document gets rank K from search engine E, etc. and will be augmented later by U a sparse set of indicator variables for user ratings across queries and documents.

After observing the results of the query on the engine the user is allowed to give feedback on the document for the query in some ordinal form where the lowest rank (e.g. one star) means completely spurious and the highest (e.g. five stars) indicates perfect or near perfect relevance. The feedback is then logged as a new query-document feature (q, d, u)=s where s is the number of stars assigned by user u. At any given point this value is the user u's current rating for document d and query q. Importantly, this feature does not depend on how many times the user performs the query but only stores his or her later rating. By collecting all the user feedback for a given query-document pair, a new set of sparse indicator variables $U(q, d)_{u,s} = 1$ is obtained if user u assigned 5 stars for document d given query q: The feature set is then augmented with those in U and the complete model is parametized with the vector $\theta$. Prior to collecting user feedback the number of stars is unknown or clear indicating that the user has not evaluated the relevance of the document explicitly. This is important as datasets will be formed purely of the documents that have been rated by the user.

The system employs user feedback to perform three basic functions. First, it uses feedback to develop a user specific vector of parameters $\psi$ in the form of additions to the global model parameters in $\theta$. Second, it is able to cluster users over the space of population of user $\psi$ vectors. Using simple techniques such as K Means Clustering, which can be expected to work well since the dimensions are regression coefficients with very clean numerical properties such as identical scale, independence, etc. This can be used to build a set of cluster specific vector of parameters, such as $\gamma$ that can be added to the vector $\theta$ in an analogous manner as the user specific $\psi$. Third, the system is able to incorporate user feedback events as data points in the modeling process for estimating $\theta$ and properties of the user's $\psi$ vector to weight the importance of the specific events.

When a user posts a number of stars for a query-document pair a data point is created in a user specific data set. A value of 1.0 is associated with a highly relevant rating and 0.0 to a spurious or not relevant rating. In a five star system, five stars are used for highly relevant and one star for not relevant. The system uses other ratings as features for other user parameters and global parameters. Technically, if it was desired to model the complete distribution, the output variables would need to be treated as drawn from a multinomial distribution. The data point is then added to an update database composed of all rating event data points in the system going back to some established period of time or to some maximum data set size. Sparse logistic regression can be performed on millions of data points. After that limit is reached, the regression is performed against the last N data points where N can be expected to be in the millions. The model estimated is specified on a per user rating event basis for any given query-document pair as $$\mu(X) = 1/[1+e^{-(\theta+\psi_u)*X}] \qquad \text{Equation (1)}$$

where $\theta$ is taken as fixed and the regression is performed over the user parameters in $\psi$. The user rating indicators in U are also incorporated so that $\psi_u$ potentially contains coefficients for the indicator $U(q, d)_{v,s} = 1$ for other users in V. For example; if a user v rates a document five stars for the query q this might have a positive coefficient indicating that it is positive evidence for the document being highly relevant for user u. The augmented feature set includes the self indicator variable $U(q, d)_{u,5}$ for highly relevant since that was the mechanism by which this instance was included in the data set. This inclusion of the very sparse self indicator will allow the regression to move past potential contradictions and make progress in the model to ensure that the document will score highly for this query and user. On the other hand, if user u is finding general effects, this sparse self indicator will not be heavily weighted. At the end of the process, each user u that submitted rating events will have a unique $\psi_u$ that can be inspected, used for clustering, etc. that personalizes the relevance scoring model for that user.

Once there are $\psi$ vectors for each identified user in the system, the vectors can be organized into a coordinate space and clustering performed. This might be helpful since it may be desirable to isolate search engine optimizers or spammers who will have eccentricities in their parameters to reflect their arbitrary bias towards their own or related content. In addition, hard clusters of identified users are able to be used to provide better default parameters for unidentified users (i.e. unregistered "visitors"). For example, based upon an unidentified user issuing query q, the probability can be formed that the user is represented by cluster c by computing p(c|q)=

$$p(c|q)=p(q|c)p(c)/[\Sigma_{c \in C} p(q|c)p(c)]$$

using Baye's rule with C the set of user clusters. Then the relevance score p(R|X) would be equal to the weighted sum of each cluster membership probability times relevance score or probablity for a given cluster membership $p_c(R|X)$ $$p(R|X)=\Sigma_{c \in C} p(c|q) p_c(R|X) \quad \text{Equation (2)}$$

where the parameters for each cluster $\gamma_C$ would be computed as additions to global parameters $\theta$. The process for this is described below.

Following the estimation of user specific parameters $\gamma_c$ an update is performed on the original model parameterized in $\theta$. This is done by using the same collection of user rating data developed to estimate the $\psi_u$'s but this time with the $\psi$ parameters fixed. Thus, an attempt is made to estimate general effects from the aggregated experience of all the users in an alternating fashion—first user specific effects and then global effects. What has been learned in the estimation of the $\psi$ parameters for each user (done via a single large scale regression) to differentially over- and under-weight each case appropriately. For example, assuming independence of the coefficients in $\psi$, the value of each data point is able to be computed as the similarity of the user to the average of the user population using a kernel function on data submitted by user u with $$K(u)=e^{-\alpha \|\psi_u - \psi_{avg}\|_2}$$

which will take on a maximum value of 1.0 and decay at rate $\alpha$ for users whose $\psi$ vectors are further from the centroid of all $\psi$ vectors. With this approach the form of the regression is to maximize the sum of the log likelihood of the data given theta $$\max 1(\theta)=\Sigma \omega_i [y_i \log(\mu(\theta+\psi_{u(i)})_i)+(1-y_i)\log(1-\mu(\theta+\psi_{u(i)})_i)] \quad \text{Equation (3)}$$

where the maximum is taken over $\theta$ and the summation is from i=1 to N, where N is the number of data points in dataset D, $y_i$ is 1.0 if the data point was rated highly relevant and 0.0 if rated not relevant, $\omega_i$ is the weight of each observation i in the data set based on properties of the submitter's $\psi_u$ parameters, and dependence on data D dropped for clarity.

Alternatively, by using the results of the hard clustering step discussed previously, parameters $\gamma_c$ are able to be fit which modify $\theta$ depending on which cluster is assigned to the user who submitted the rating data point. Hard clustering refers to the assignment of each user to a single cluster as opposed to soft clustering a user to multiple clusters with some degree of membership in each. In this case regression is performed using equation (3) but the optimization is performed jointly over $\theta$ and the $\gamma_c$ where $\mu$ is specified:

$$\mu(X;\theta,\gamma_c)=1/[1+e^{-(\theta+\gamma C+\psi u)*X}]$$

assigning the $\gamma_c$ based on the cluster membership of the user submitting the specific data point used to generate features X and calculate $\mu(\theta,\gamma)_i$. As shown earlier for the user specific $\psi$ regression, any conflicts in rating behavior can be absorbed into the cluster specific modifiers for each parameter contained in $\gamma_c$.

As a concrete example for using the gammas, it is assumed that a data set from 200 users submitting anywhere from a few to hundreds of rating events where for each user a cluster assignment c from the set of clusters C is made. When the estimation of $\theta$ (such as $\theta$(EngineRank$_{E,4}$)), an estimation is also made for the corresponding $\gamma_c$ such as $\gamma_k$ (Enginerank$_{E,4}$)) assuming that the user was in cluster k.) In another data point, $\theta$(EngineRank$_{E,4}$) is estimated but this time $\gamma_m$(Enginerank$_{E,4}$)) is determined for cluster m, assuming the document had EngineRank$_{E,4}$ for the query and that the two users were from clusters k and m, respectively. As a result, $\theta$(EngineRank$_{E,4}$) is now the average effect of the variable and the $\gamma$(Enginerank$_{E,4}$)'s contain the cluster specific effect of the variable (e.g., an SEO cluster might have a negative coefficient since they will likely be less sensitive than average to good variables but their deleterious influence is effectively removed from the global model. Within the model fitting process it is all the same since when the feature vector is populated according to the user's cluster assignment.

In both the schemes described for global updates the users' ratings determine the influence of each user over the fitting of the global parameters. In either case, the effects of user input based on his or her rating behavior are automatically limited.

By optimizing first one set of parameters for the user and then another for the global and/or cluster effects the fitting process alternates focus between two distinct levels of analysis. It is not entirely clear whether the optimizations should be performed sequentially over-modeling runs or individual iterations of an alternating optimization.

Figure 3:
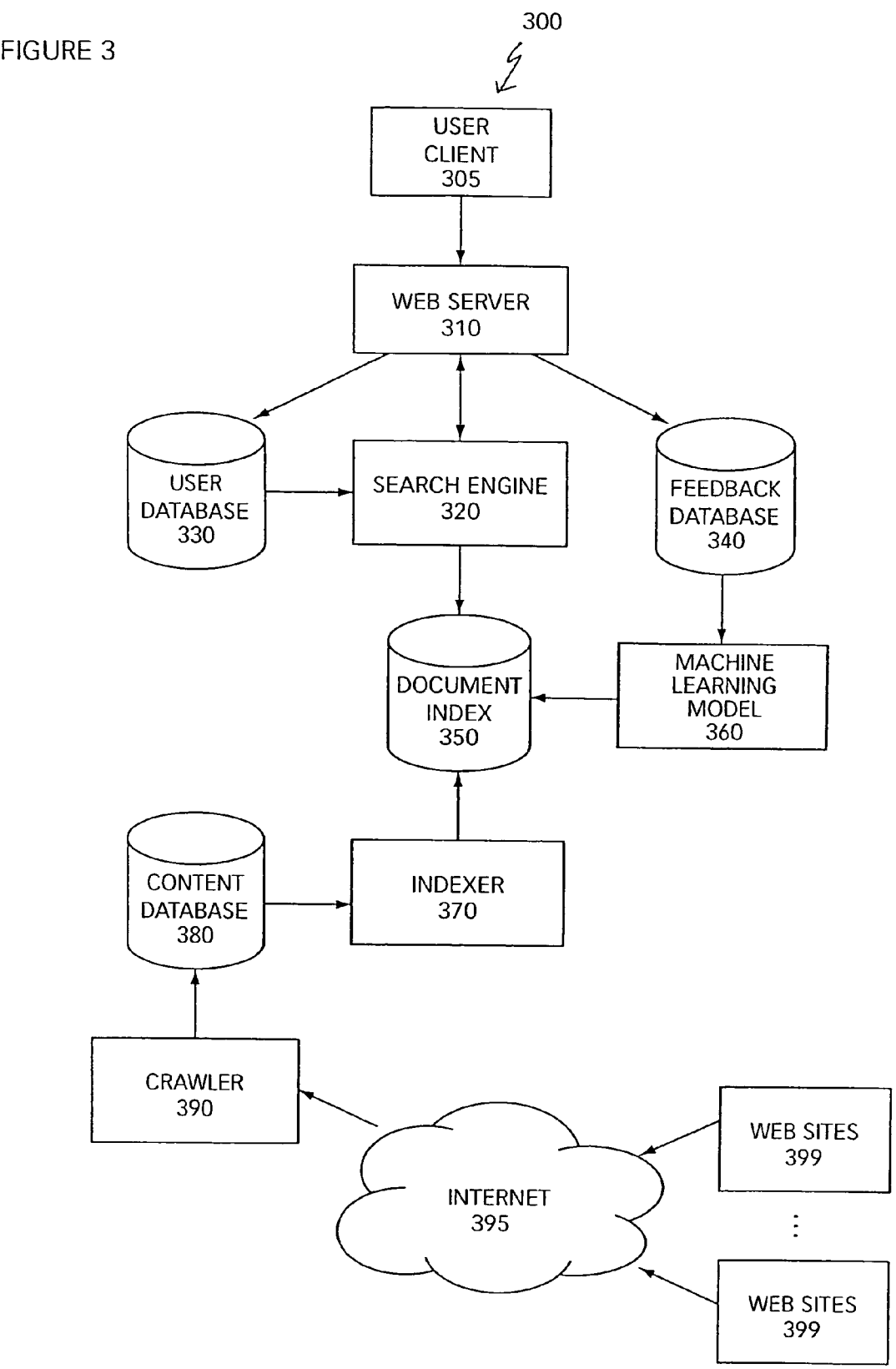
FIG. 3 is a schematic diagram illustrating the components of an exemplary Internet search application flow diagram, in accordance with the invention.

FIG. 3 illustrates the components of a system 300 in accordance with the present invention. The system 300 comprises a user client 305 that connects to a Web server 310. The Web server 310 is coupled to a search engine 320, a user database 330, and a feedback database 340. The search engine 320 is coupled to a data repository 350 containing document indices. The user database 330 is also coupled to the search engine 320. The feedback database 340 is coupled to a machine learning model 360 for calculating new relevance factors. The machine learning model 360 is also coupled to a data repository 350 containing document indices, which in turn is coupled to an indexer 370. The indexer 370 is coupled to a Web content database 380, which is coupled to a Web crawler 390. The Web crawler 390 is coupled to one or more Web sites 399 over the Internet 395.

In operation, the web crawler 390 navigates over the Internet 395, visiting Web sites 399, and populating the Web content database 380 with the contents of the Web pages it accesses. The indexer 370 uses the Web content database 380 to create the document index 350. When a user generates a query on the user client 305, the Web server 310 transmits the search request to the search engine 320. The search engine 320 uses relevance algorithms and factors derived from the user feedback described above to determine which Web pages are probably most relevant to the query and creates the results list, which is sent to the Web server 310. The Web server 310 then delivers the results page to the user client for display.

Also, when a user conducts a search, he enters a query using the user client 305, which is submitted to the Web server 310. The Web server 310 submits the query to the search engine 320 which matches the query against the document index 350 to determine the most relevant documents, and returns the result list to the Web server 310. Also in response to the query, the user database 330 records information about the users' search, such as links saved using the save link mechanism (e.g., area 190, FIG. 1), links followed (e.g, area 160, FIG. 1), and feedback given using the feedback mechanism (e.g., area 170, FIG. 1). This information is used by the Web server 310 and the search engine 320 to customize subsequent search results for that user. Also in response to a query, feedback from the feedback mechanism (e.g, area 170, FIG. 1) is also recorded in the feedback database 340. Within an embodiment of the invention, the feedback information stored in the user database 330 and the feedback database 340 may be implemented as two separate databases or they may be implemented within the same database.

On some timely basis, but not necessarily when a query is performed, the feedback information contained in the feedback database 340 is sent to the machine learning model 360, where it is processed to generate the methods and weights used by the search engine to determine the most relevant Web pages for queries. The machine learning model 360 records this feedback information in the document index 350 for use in subsequent searches.

The feedback database 340 sends features to the machine learning model 360 including, but not limited to, query terms, user identifiers, document IDs, document links, positions in results list, user ratings, and user clicks. The machine learning model 360 can also look up other features for the given document including, but not limited to, term scores, section information, link structures, anchor text summary, tags, a term within a document, a location of a term within the document, a structure of the document, a number of times the document has been accessed from a search results list, term scores, section information, link structures, a user representation, a time of a user input, blocking.

The machine learning model 360 uses these features to develop a user specific set of parameters in the form of additions to the global model parameters. These parameters are derived as follows: Each feedback event constitutes a data point, which is added to a database of all data points in the feedback database 340. A model is used to estimate on a per user rating event for any given query-document pair, as given by equation (1) above.

A regression is performed over the input data referred to previously. Once the best parameters have been found, these parameters are used to update the global model and user specific models. Generally, the best parameters will have the best predictive power, which translates into better results on unseen data. In one embodiment of the present invention, logistic regression using conjugate gradient descent is performed as part of a modeling process. It will be appreciated that the modeling process in accordance with the present invention can be performed using other forms of regression, as well as other methods.

It will be appreciated that many types of machine learning techniques are able to be used in accordance with the present invention, including those that use a form of statistical classification. The statistical classifications include, but are not limited to, a logistic regression analysis, a support vector machine, neural networks, boosted trees, random forests, naive Bayes, graphical models, and maximum a posteriori. In other embodiments, the machine learning technique uses a conjugate gradient descent.

Figure 4:
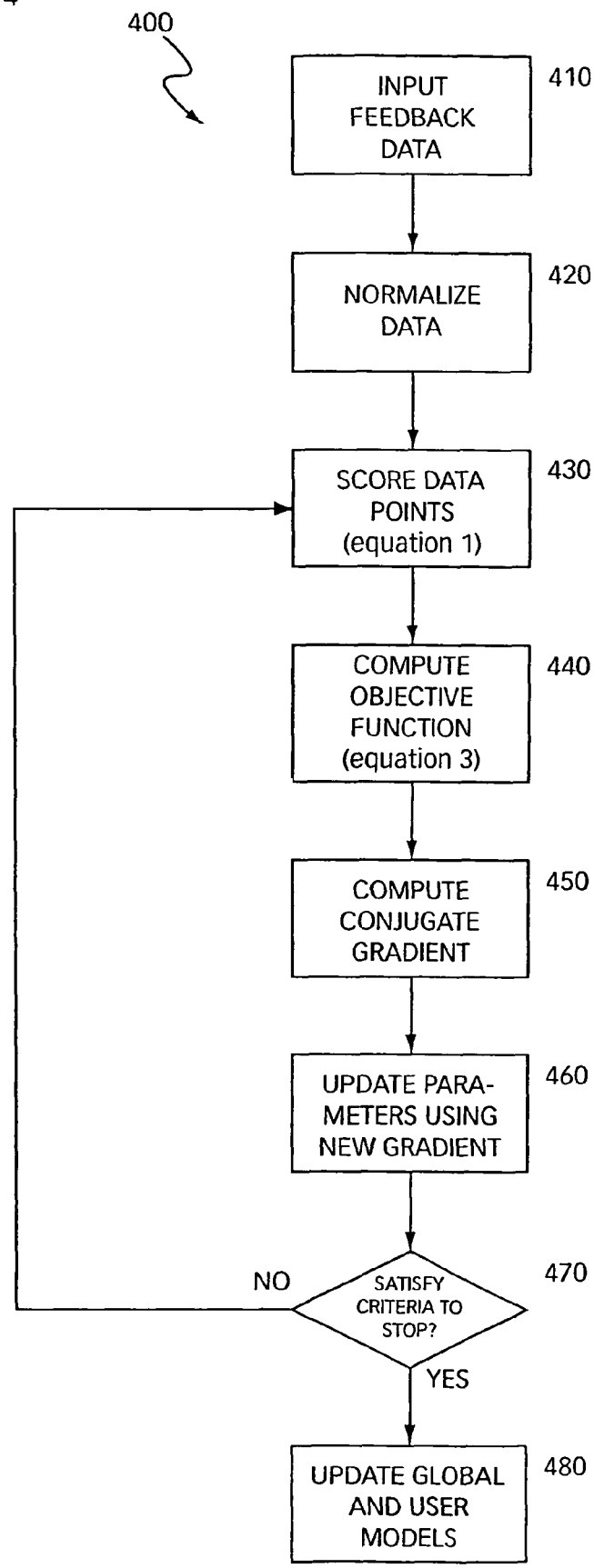
FIG. 4 is a flow diagram illustrating steps to compute results contained in a results list using user feedback data in accordance with the present invention.

FIG. 4 is a flow diagram illustrating steps 400 for computing results using user feedback data, in accordance with one embodiment of the present invention. Equation numbers referenced in FIG. 4 and the accompanying text refer to the equations.

Referring to FIG. 4, in the step 410, a user inputs feedback data, and in the step 420, the input data is normalized, which includes extraction and normalization of global and per user data. In the step 430, data points are scored using equation (1), and in the step 440, the objective function is computed using equation (3) above. Equation (1) can include many forms, including scoring using clustering. In the step 450, the conjugate gradient is computed, and in the step 460, the new gradient is used to update parameters. In the step 470, it is determined whether one or more stop criteria, have been met. If the one or more stop criteria have not been met, the process loops back to the step 430; otherwise, the process continues to the step 480, where global and user models are updated.

Any number and types of criteria can be used as the stop criteria in the step 470. For example, the stop criteria can include but are not limited to (1) that the iterations were performed a predetermined maximum number of times, (2) that a cross validation failed (e.g., test data differed from trial data), (3) that the solution converged, that is, that a difference between parameters in a previous run and the next run is less than a predetermined value).

Figure 5:
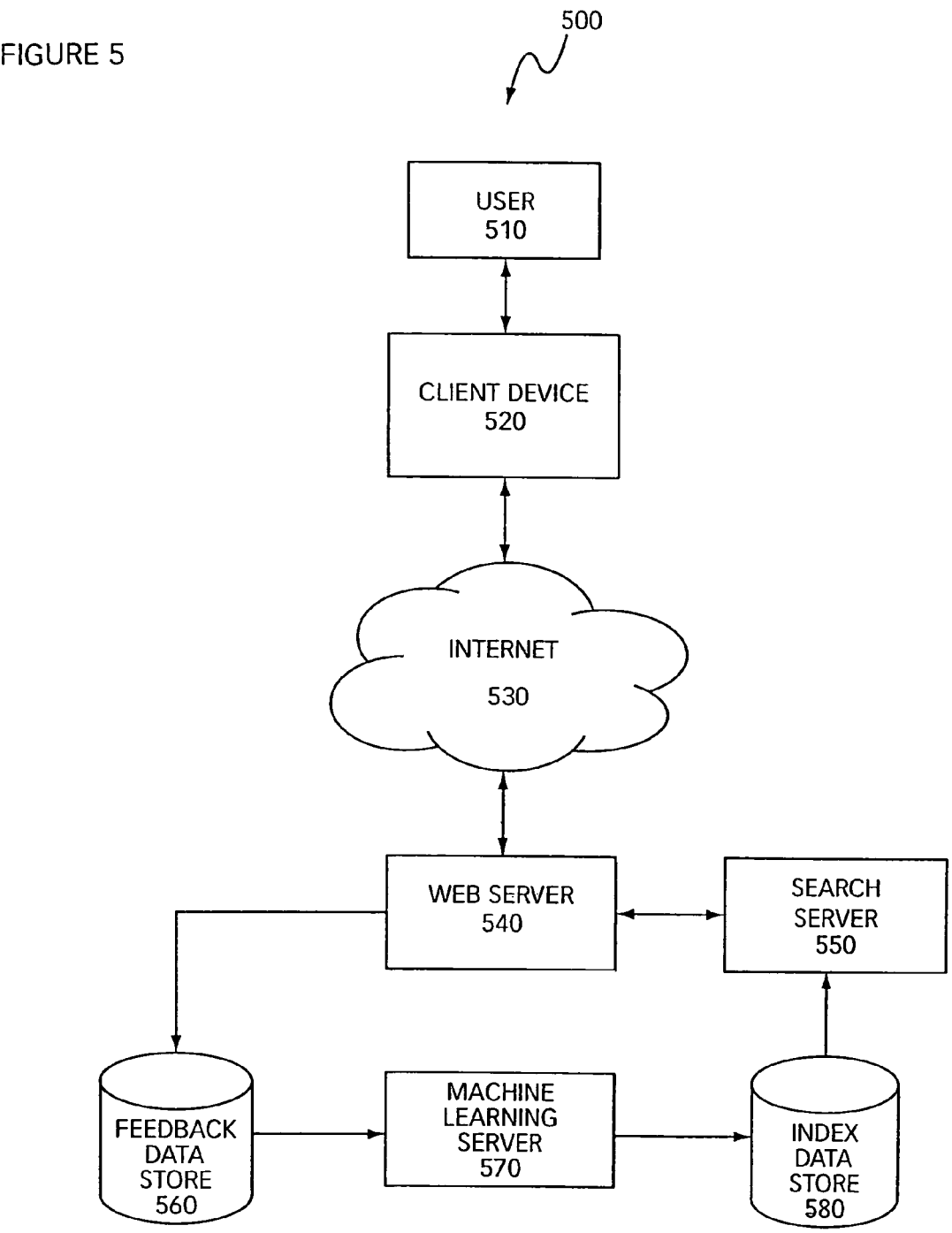
FIG. 5 is a hardware diagram illustrating the components of an exemplary Internet search application in accordance with the present invention.

FIG. 5 illustrates the hardware components for an Internet search application system 500 for use by a user 510 in accordance with the present invention. The system 500 comprises a client device 520 coupled over the Internet 530 to a Web server 540. The client device 520 is any device used to access the Web server 540 and configured to communicate using Internet protocols including, but not limited to, http (the Hypertext Transfer Protocol), and WAP (Wireless Application Protocol). Preferably, the client device 520 is a personal computer but it can also be another device including, but not limited to, a hand held device such as a cell phone or personal digital assistant (PDA) and is capable of presenting information using standards such as HTML (the Hypertext Markup Language), HDML (Handheld Device Markup Language), WML (wireless markup language), or the like.

The Web server 540 is coupled to both a search server 550 and a feedback data store 560. The feedback data store 560 is coupled to a machine learning server 570 and the search server 550 is coupled to an index data store 580. Additionally the machine learning server 570 is coupled to the index data store 580.

It will be readily apparent to one skilled in the art that other modifications can be made to the embodiments without departing from the spirit and scope of the invention as defined by the appended claims.

We claim:

1. A computer-implemented method of ranking document returned in a results list in response to a search query, comprising entering a search query;

displaying a results list of documents returned in response to the search query;

receiving and storing input from the user indicating the relevance to the user of a document in the results list of documents;

modifying the weight of previous input from the user indicating the relevance of the document to the user;

associating the user input indicating the relevance to the user of the document in the results list with the search query and with the document;

determining a relevance formula having variables and parameters, the relevance formula for computing a relevance score for the document and the search query, wherein the variables comprise a plurality of features, a feature of the plurality of features comprises one of: a frequency of occurrence of a term in the document, a frequency of hyperlinks containing a term in the document, and a frequency of occurrence of a term in an abstract of the document, and the parameters comprise a plurality of weighting factors corresponding to each of the features;

ranking the document based on the relevance score, wherein the relevance score is dependent on the user input associated with the document and the search query; and presenting the ranked results list of documents to the user.

2. The method of claim 1, wherein the user input is blocking the document, and the relevance score is lowered.

3. The method of claim 1, wherein the user input regarding the relevance of the document is a vote, and the relevance of the document is increased if the vote is in favor of the document and the relevance of the document is decreased if the vote disfavors the document.

4. The method of claim 1, wherein the weight of a user input is reduced if the user input is repetitive of previous user input.

5. The method of claim 1, wherein the weight of a user input is reduced in relation to a deviation of the user input from previously stored input by other users.

6. The method of claim 1, wherein the previously stored input from a user is retrieved prior to the initiation of the search query.

7. The method of claim 1, wherein determining the relevance formula comprises utilizing the user input to update the relevance formula and modify at least one of the weighting factors.

8. The method of claim 1, wherein at least one of the plurality of features is selected from the group consisting of a tag, a frequency of occurrence of a term in the summary information in the document, a structure of the document, the length of the document, the type of the document, the date of creation of the document, a link to the document, a position of the document in a search results list, a number of times the document has been accessed from a search results list, term scores, and link structures.

9. The method of claim 1, wherein at least one of the plurality of features is selected from the group consisting of a user representation, a time of a user input, a user blocking the document, a user identifier for the document, a user saving the document, a user bookmarking the document, a user tagging the document, a user rating of the document, and a user indicating one of a positive and a negative, relevance of the document to the user and the search query.

10. The method of claim 7, wherein the relevance formula corresponds to a user model and a group model, wherein the user model is for determining a relevance score of the document and a search query for a user and the group model is for determining a relevance score of the document and a search query for a group of users.

11. The method of claim 10, further comprising comparing the user model to the group model to determine a bias toward the document, and decreasing the weight of the user model if the user model bias diverges from the group model bias.

12. The method of claim 7, wherein the parameters are determined using machine learning technique.

13. The method of claim 12, wherein the machine learning technique comprises a form of statistical classification.

14. The method of claim 13, wherein the statistical classification is any one of a logistic regression analysis, a support vector machine, neural networks, boosted trees, random forests, naive Bayes, and graphical models.

15. The method of claim 12, wherein the machine learning technique uses a conjugate gradient descent.

16. The method of claim 1, wherein the relevance score is for a user registered on a search engine site and is used to determine a relevance score for a document and a search query for a user not registered on the search engine site.

17. The method of claim 1, further comprising updating the relevance formula wherein updating the relevance formula comprises updating the parameters, and the plurality of features comprise at least two from the group consisting of a tag, a term within the document, a frequency of occurrence of a term in the link text of the document, a frequency of occurrence of a term in the abstract of the document, a frequency of occurrence of a term in the summary of the document, a frequency of occurrence of a term in anchor text in the document, a frequency of occurrence of a term in the summary information in the document, a structure of the document, the length of the document, the type of the document, the date of creation of the document, a link to the document, a position of the document in a search results list, a number of times the document has been accessed from a search results list, term scores, link structures, a user representation, a time of a user input, a user blocking the document, a user identifier for the document, a user saving the document, a user bookmarking the document, a user tagging the document, and a user rating of the document.

18. The method of claim 1, wherein the parameters are updated using the user feedback for each of the multiple results.

19. The method of claim 18, wherein the user feedback is one of tagging a document, rating a relevance of a document in response to a search query, and blocking a document.

20. The method of claim 1, wherein the relevance model is for determining a set of user specific parameters for determining a relevance score for a search query and a document for a specific user.

21. The method of claim 20, wherein the relevance model is also for determining parameters of a group model for determining a relevance score for a search query and a document for a group of users.

22. The method of claim 1, wherein the plurality of features comprises the frequency of occurrence of a term within the abstract of a document, and a user rating of the relevance of the document to the user.

23. A non-transitory computer readable medium programmed with executable instructions for implementing the method of claim 1.

24. A system for ranking documents returned in a results list of documents returned in response to a search query, the system comprising a computing system, including:
    an input system configured to receive a search query;
    a display system configured to display the results list of documents returned in response to the search query;
    the input system is further configured to receive input from the user indicating the relevance to the user of a document in the results list of documents;
    a storage medium configured to store the input from the user indicating the relevance to the user of the document;
    a processor coupled to a memory programmed with processor executable instructions to:
    reduce the weight of previous input from the user indicating the relevance of the document to the user;
    associate the user input indicating the relevance to the user of the document with the search query and with the document;
    determine a relevance formula having variables and parameters, the relevance formula for computing a relevance score for the document and the search query, wherein the variables comprise a plurality of features, the parameters comprise a plurality of weighting factors corresponding to each of the features, and a feature of the plurality of features comprises one of a frequency of occurrence of a term in one of the document, a link text of the document, an abstract of the document, a summary of the document, and an anchor text in the document; and
    rank the document based on the relevance score, wherein the relevance score is dependent of the user input associated with the document and the search query;
    wherein the display system is further configured to the present the ranked results list of documents to the user.

* * * * *

UNITED STATES PATENT AND TRADEMARK OFFICE
CERTIFICATE OF CORRECTION

| | | Page 1 of 1 |
|---|---|---|
| PATENT NO. | : 8,185,523 B2 | |
| APPLICATION NO. | : 11/378756 | |
| DATED | : May 22, 2012 | |
| INVENTOR(S) | : Lu et al. | |

It is certified that error appears in the above-identified patent and that said Letters Patent is hereby corrected as shown below:

ON THE PATENT COVER SHEET

In the Patent Cover Sheet, in field (56) References Cited, please add the following references to the list of references cited.

| | | |
|---|---|---|
| 6,070,176 | 2000/5 | Downs et al. ........................707/513 |
| 6,714,929 B1 | 2004/3 | Micaelian et al. ..................707/4 |
| 6,829,599 B2 | 2004/12 | Chidlovskii ........................707/3 |
| 2003/0078914 A1 | 2003/4 | Witbrock ............................707/3 |
| 2004/0215608 A1 | 2004/10 | Gourlay .............................707/3 |
| 2004/0254917 A1 | 2004/12 | Brill et al. ..........................707/3 |
| TW 530224 | 2003/05 | Chen et al. |
| TW 548557 | 2003/08 | Qiu et al. |
| TW 200422878 | 2004/11 | Manber et al. |

Signed and Sealed this
Fourteenth Day of August, 2012

David J. Kappos
*Director of the United States Patent and Trademark Office*